US009775275B2

(12) United States Patent
Yi et al.

(10) Patent No.: US 9,775,275 B2
(45) Date of Patent: Oct. 3, 2017

(54) AGRICULTURAL ROTARY TILLAGE MACHINE

(71) Applicants: AGRICULTURAL UNIVERSITY OF HEBEI, Hebei (CN); HEBEI ZHONGNONGBOYUAN AGRICULTURAL EQUIPMENT CO., LTD, Gaocheng Shijiazhuang, Hebei (CN)

(72) Inventors: Jinggang Yi, Hebei (CN); Guobin Zhang, Gaocheng Shijiazhuang (CN); Baojian Cui, Hebei (CN); Yazhou Xing, Hebei (CN); Honglei Wu, Hebei (CN); Yongwei Yuan, Hebei (CN); Yanjie Bai, Gaocheng Shijiazhuang (CN)

(73) Assignees: AGRICULTURAL UNIVERSITY OF HEBEI, Hebei (CN); HEBEI ZHONGNONGBOYUAN AGRICULTURAL EQUIPMENT CO., LTD., Gaocheng, Shijiazhuang, Hebei (CN)

( * ) Notice: Subject to any disclaimer, the term of this patent is extended or adjusted under 35 U.S.C. 154(b) by 0 days.

(21) Appl. No.: 15/035,501

(22) PCT Filed: Dec. 10, 2015

(86) PCT No.: PCT/CN2015/096924
§ 371 (c)(1),
(2) Date: May 10, 2016

(87) PCT Pub. No.: WO2016/169276
PCT Pub. Date: Oct. 27, 2016

(65) Prior Publication Data
US 2017/0112042 A1 Apr. 27, 2017

(30) Foreign Application Priority Data

Apr. 22, 2015 (CN) .................... 2015 2 0244331 U

(51) Int. Cl.
*A01B 33/02* (2006.01)
*A01B 49/02* (2006.01)

(52) U.S. Cl.
CPC .......... *A01B 33/021* (2013.01); *A01B 33/028* (2013.01); *A01B 49/022* (2013.01); *A01B 49/027* (2013.01)

(58) Field of Classification Search
CPC ... A01B 33/021; A01B 33/028; A01B 49/022; A01B 49/027; A01B 49/02; A01B 27/005; A01B 29/048; A01B 29/06; A01B 35/18
See application file for complete search history.

(56) References Cited

U.S. PATENT DOCUMENTS 3,502,153 A * 3/1970 Bradshaw ............ A01B 33/028
  172/256
4,258,635 A * 3/1981 Lutz ..................... A01B 33/021
  111/135

(Continued)

FOREIGN PATENT DOCUMENTS

| CN | 202476041 | 10/2012 |
| CN | 103168515 | 6/2013 |
| CN | 204539725 | 8/2015 |
| DE | 4210816 | 10/1993 |
| DE | 102007050508 A1 * | 4/2009 | ............ A01B 45/04 |
| JP | 2004166517 | 6/2004 |
| NL | 1006225 C1 * | 12/1998 | ........... A01B 33/021 |

OTHER PUBLICATIONS

International Search Report filed in PCT/CN2015/096924 dated Mar. 23, 2016.

*Primary Examiner* — Matthew D Troutman
(74) *Attorney, Agent, or Firm* — Rankin, Hill & Clark LLP

(57) ABSTRACT

A facility agricultural laser measure and control motor rotary tillage flattening machine includes a front axle part, a lifting (Continued)

equipment, a rotary tillage component, a battery pack, a rear axle steering part, a rotary flattening component and a rack. A front axle housing connects with the rack. The rotary tillage component comprises a DC motor, a gearbox and a rotary tillage blade. The DC motor connects with the gearbox through transmission. An output shaft of the gearbox connects with the rotary tillage blade. The rear axle steering part includes a rotary seat, a rotary shaft, a steering handlebar, a rear axle stand and squirrel-cage hubs. An upper end of the rotary shaft is equipped with a steering handlebar. The rear axle stand is equipped with two squirrel-cage hubs through a supporting axle. The rotary flattening component connects with the rack through an electromotive handspike and a flexible torsion bar.

3 Claims, 3 Drawing Sheets

(56) References Cited

U.S. PATENT DOCUMENTS

| | | | | |
|---|---|---|---|---|
| 4,321,969 | A * | 3/1982 | Wilson | A01B 33/028 |
| | | | | 172/42 |
| 6,338,209 | B1 * | 1/2002 | McClure | A01B 33/028 |
| | | | | 172/329 |
| 8,763,714 | B2 * | 7/2014 | Orlando | A01B 3/64 |
| | | | | 172/23 |
| 2003/0230421 | A1 * | 12/2003 | Crowley, II | E02F 3/7677 |
| | | | | 172/684.5 |
| 2005/0194163 | A1 * | 9/2005 | Wray | A01B 69/008 |
| | | | | 172/811 |

* cited by examiner

AGRICULTURAL ROTARY TILLAGE MACHINE

FIELD OF THE INVENTION

The invention relates to the field of facility agriculture, in particular, to a facility agricultural laser measure and control motor rotary tillage flattening machine.

BACKGROUND OF THE INVENTION

Facility agriculture starts late in China, hence the level of mechanization is still low, and most of the operations still rely mainly on primitive manual labor with high labor intensity, low efficiency and poor working condition. With the rapid development of greenhouse planting patterns, the demand for ground flatness is growing especially for precision facility agriculture. The planting requirement for the ground flatness cannot be met by the manual labor. On the other hand, because of the specificity of the workspace of greenhouse, a field working agricultural machine cannot be operated normally therein. A limited number of small-sized agricultural power machines are usually powered by diesel engines or petrol engines. The diesel engines and petrol engines have many limitations. Gas emission of diesel engines, noise of oil-burning power machines and the ejection, spray, dropping and leakage of fuel tanks, if any, would bring terrible environmental pollution to the greenhouse. At the same time, the existing agricultural work machines are relatively complex to operate and require big workspace, and thus may be prone to hurt operators or persons around if there is any carelessness. Hence the existing agricultural machines are not suitable for use in narrow space such as a greenhouse. Therefore, a small-sized and environmental-friendly rotary tillage flattening all-in-one machine adapted to facility agricultural operation conditions is desired urgently.

SUMMARY OF THE INVENTION

The invention aims to provide a facility agricultural laser measure and control motor rotary tillage flattening machine. The facility agricultural laser measure and control motor rotary tillage flattening machine possesses an elaborate design, an impact structure, and can protect environment and save energy, and make the rotary tillage and flattening in the facility agriculture be all in one.

The following technical solutions are adopted in this invention in order to achieve the above purposes.

a facility agricultural laser measure and control motor rotary tillage flattening machine, including a front axle part constituted by a low-speed DC motor connected with driving wheels on left and right sides through a differential transmission system mounted inside a front axle housing, a lifting equipment, a rotary tillage component, a battery pack, a rear axle steering part, a rotary flattening component and a rack. Wherein the front axle housing of the front axle part is connected with the rack through the lifting equipment. The rotary tillage component comprises a DC motor, a gearbox and a rotary tillage blade. The DC motor is connected with the gearbox through transmission of a chain. An output shaft of the gearbox is connected with the rotary tillage blade. The rotary tillage component is mounted at the front of the rack fixedly through the gearbox. The rear axle steering part includes a rotary seat, a rotary shaft, a steering handlebar, a rear axle stand and squirrel-cage hubs. The rotary seat is connected fixedly with the rack. The rotary shaft is mounted on the rotary seat. An upper end of the rotary shaft is equipped with the steering handlebar. A lower end of the rotary shaft is connected with the rear axle stand. The rear axle stand is equipped with two squirrel-cage hubs through a supporting axle. The rotary flattening component is connected with the rack through a second electric actuator and a flexible torsion bar. The battery pack is located on the rack arranged in the front and back of the rotary tillage component.

The lifting equipment includes a crank rocker arm and a first electric actuator. A lower end of the crank rocker arm is connected with the front axle part through a U-shape connector. A middle portion of the crank rocker arm is hinged with the rack. An upper end of the crank rocker arm is hinged with the first electric actuator through a pin. A pedestal of the first electric actuator is hinged on the rack.

The rotary flattening component includes a second electric actuator, a flexible torsion bar, a scraper, a blade connector and a laser receiver. An upper side of the scraper is hinged with a lower end of the second electric actuator through the blade connector. A pedestal of the second electric actuator is hinged on the rack. One end of the flexible torsion bar is connected with the blade connector through a connecting sleeve. The other end of the flexible torsion bar is hinged on the rack through a connector. The laser receiver is mounted on the blade connector through a supporting rod.

In the above technical solutions, elongation and shortening of the first electric actuator can enable the crank rocker arm to drive the front axle part to rotate around the first pin, so as to achieve the lifting adjustment of a rotary tillage blade of the rotary tillage component relative to the ground. Both the two squirrel-cage hubs are rotated freely on the supporting axle of the rear axle stand. On one hand, the adoption of the two squirrel-cage hubs is helpful to achieve steering. On the other hand, the two squirrel-cage hubs are positioned behind the soil layer after being rolled and rotary tillage; the soil layer has shallow ruts and loose soil texture and is helpful for subsequent operations. When the location signal is received by the laser receiver differs from a given base level, the second electric actuator elongates or shortens automatically under the action of a control system, thereby adjusting the height of the scraper. when the location signals is received by two laser receivers are different, the elongation and/or shortening amounts of two second electric actuators are different too, and thus the torsion deformation property of the flexible torsion bar is utilized to achieve the side-lurch rotary flattening purpose of the scraper. Moreover, the rigidity of the scraper is still maintained so as to achieve the purpose of rotary flattening of the ground. By adopting such a design, not only is the structure impact, but also energy is saved and the environment is protected, thereby achieving the integrality of rotary tillage and flattening in facility agriculture.

Wherein,
1. Front axle housing;
2. Low-speed DC motor;
3. U-shape connector;
4. Driving wheel;
5. First pin;
6. Second pin;
7. Gearbox;
8. First electric actuator;
9. Rotation shaft;
10. Connecting sleeve;
11. DC motor;
12. Battery pack;
13. Crank rocker arm;
14. Rotary seat;
15. Rear axle stand;
16. Squirrel-cage hub;
17. Scraper;
18. Blade connector;
19. Supporting rod;
20. Laser receiver;
21. Rack;
22. Rotary tillage blade;
23. Flexible torsion bar;
24. Rotary shaft;
25. Steering handlebar;
26. Second electric actuator;
27. Chain.

DETAILED DESCRIPTION OF THE PREFERRED EMBODIMENT

The invention will be further described by reference to the drawings.

Figure 1:
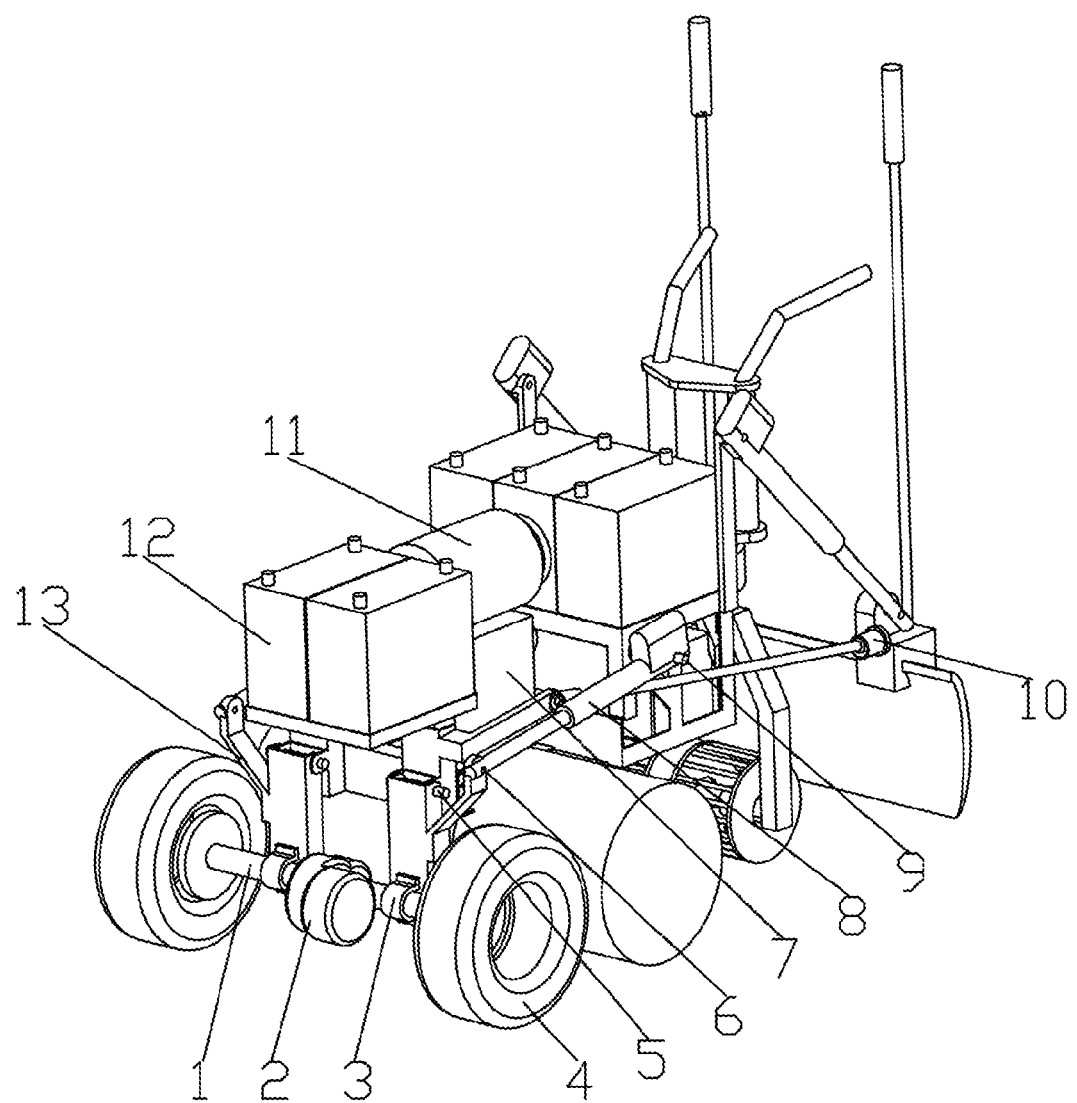
FIG. 1 is an isometric structural schematic view of a facility agricultural laser measure and control motor rotary tillage flattening machine according to the invention.
Figure 2:
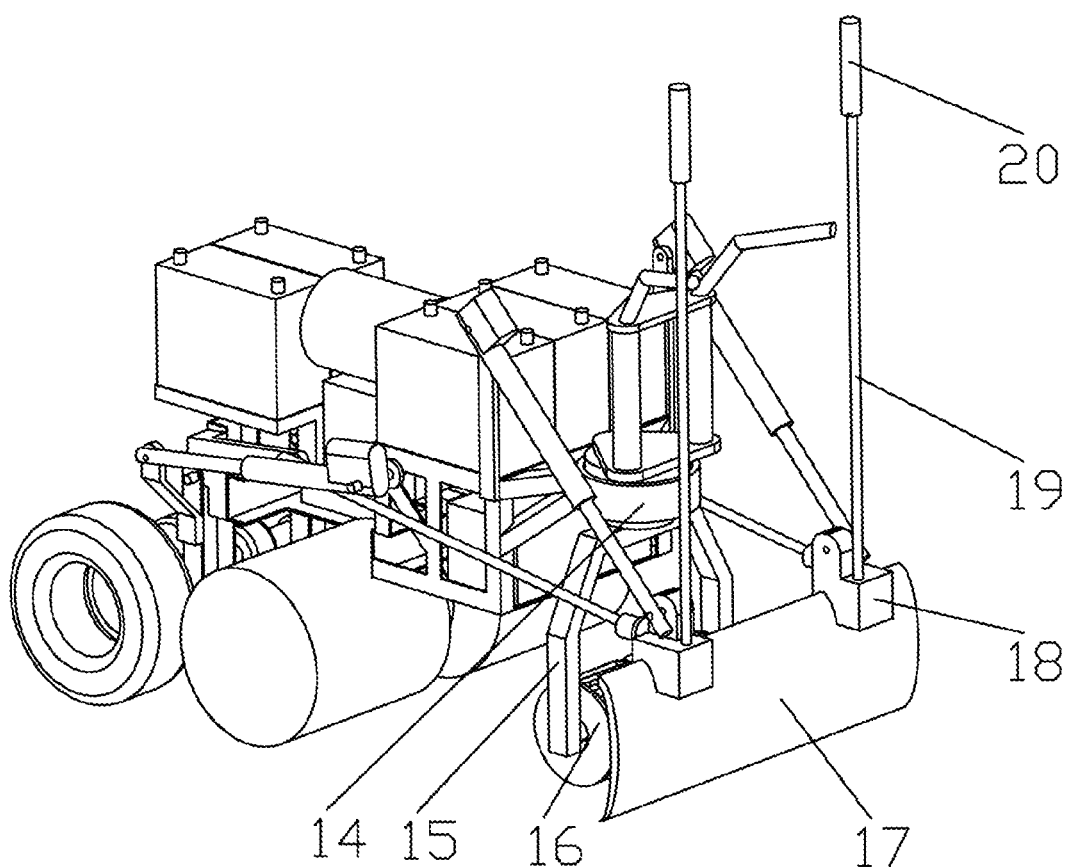
FIG. 2 is a rear structural schematic view of a facility agricultural laser measure and control motor rotary tillage flattening machine according to the invention.
Figure 3:
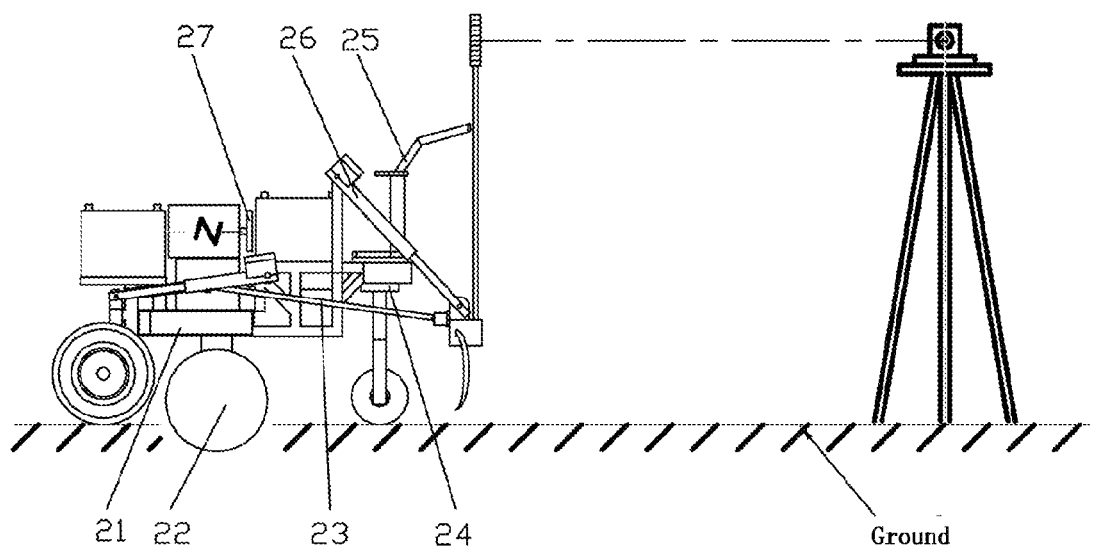
FIG. 3 is an operation schematic view of a facility agricultural laser measure and control motor rotary tillage flattening machine according to the invention.

As shown in FIGS. 1, 2 and 3, a facility agricultural laser measure and control motor rotary tillage flattening machine which includes a front axle part constituted by a low-speed DC motor 2 connected with driving wheels 4 on left and right sides through a differential transmission system mounted inside a front axle housing 1, a lifting equipment, a rotary tillage component, a battery pack 12, a rear axle steering part, a rotary flattening component and a rack 21. The front axle housing 1 of the front axle part is connected with the lifting equipment through a U-shape connector 3. The lifting equipment includes a crank rocker arm 13 and a first electric actuator 8. A lower end of the crank rocker arm 13 is connected with the front axle part through the U-shape connector 3. A middle portion of the crank rocker arm 13 is hinged with the rack 21 through a first pin 5. An upper end of the crank rocker arm 13 is hinged with the first electric actuator 8 through a second pin 6. A pedestal of the first electric actuator 8 is hinged on the rack 21 through a rotation shaft 9. Elongation and shortening of the first electric actuator 8 can enable the crank rocker arm 13 to drive the front axle part to rotate around the first pin 5 so as to achieve the lifting adjustment of a rotary tillage blade 22 of the rotary tillage component relative to the ground. The rotary tillage component comprises a DC motor 11, a gearbox 7 and a rotary tillage blade 22. The DC motor 11 is connected with the gearbox 7 through transmission of a chain 27. An output shaft of the gearbox 7 is connected with the rotary tillage blade 22. The rotary tillage component is mounted at the front of the rack 21 fixedly through the gearbox 7. The rear axle steering part includes a rotary shaft 24, a steering handlebar 25, a rear axle stand 15 and squirrel-cage hubs 16. The rotary seat 14 is connected fixedly with the rack 21. The rotary shaft 24 is mounted on the rotary seat 14. An upper end of the rotary shaft 24 is equipped with the steering handlebar 25. A lower end of the rotary shaft 24 is connected with the rear axle stand 15. The rear axle stand 15 is equipped with two squirrel-cage hubs 16 through a supporting axle. Both the two squirrel-cage hubs 16 can rotate freely on the supporting axle of the rear axle stand 15. On one hand, the adoption of the two squirrel-cage hubs 16 is helpful to achieve steering. On the other hand, the two squirrel-cage hubs 16 are positioned behind the soil layer after being rolled and rotary tillage. The soil layer has shallow ruts and loose soil texture and is helpful for subsequent operations. The rotary flattening component includes a second electric actuator 26, a flexible torsion bar 23, a scraper 17, a blade connector 18 and a laser receiver 20. An upper side of the scraper 17 is hinged with a lower end of the second electric actuator 26 through the blade connector 18. A pedestal of the second electric actuator 26 is hinged on the rack 21. One end of the flexible torsion bar 23 is connected with the blade connector 18 through a connecting sleeve 10. The other end of the flexible torsion bar 23 is hinged on the rack 21 through a connector. The laser receiver 20 is mounted on the blade connector 18 through a supporting rod 19. When the location signal received by the laser receiver 20 differs from a given base level, the second electric actuator 26 will elongate or shorten automatically under the action of a control system to adjust the height of the scraper. when the location signals received by two laser receivers 20 are different, the elongating and/or shortening amounts of two second electric actuators 26 are different too, and the torsion deformation property of the flexible torsion bar 23 can be utilized to achieve the side-lurch rotary flattening of the scraper 17, moreover, the rigidity of the scraper 17 is still maintained so as to achieve the purpose of rotary tillage flattening of the ground. The battery pack 12 is located on the racks 21 arranged in the front and back of the rotary tillage component.

The embodiment is merely an explanation of the conception and achievement of the invention which is not the limitation thereof, and technical solutions within the conception of the invention without any substantial alternations should be deemed as within the protection scope of the invention.

What is claimed is:
1. An agricultural machine, comprising a front axle part including a first DC motor connected with driving wheels on left and right sides through a differential transmission system mounted inside a front axle housing, lifting equipment, a rotary tillage component, a battery pack, a rear axle steering part, a flattening component and a rack; wherein the front axle housing of the front axle part is connected with the rack through the lifting equipment; the rotary tillage component comprises a second DC motor and a gearbox which are connected with each other through a transmission of a chain, and a rotary tillage blade; an output shaft of the gearbox is connected with the rotary tillage blade; the rotary tillage component is mounted at the front of the rack fixedly through the gearbox; the rear axle steering part includes a rotary seat, a rotary shaft, a steering handlebar, a rear axle stand and two squirrel-cage hubs; the rotary seat is connected fixedly with the rack; the rotary shaft is mounted on the rotary seat; an upper end of the rotary shaft is equipped with the steering handlebar; a lower end of the rotary shaft is connected with the rear axle stand; the rear axle stand is equipped with the squirrel-cage hubs through a supporting axle; the flattening component is connected with the rack through a first electric actuator and a flexible torsion bar; the battery pack is located on the rack arranged in the front and back of the rotary tillage component.

2. The agricultural machine of claim 1, wherein the lifting equipment comprises a crank rocker arm and a second electric actuator; a lower end of the crank rocker arm is connected with the front axle part through a U-shape connector; a middle portion of the crank rocker arm is hinged with the rack; an upper end of the crank rocker arm is hinged with the second electric actuator through a pin; a pedestal of the second electric actuator is hinged on the rack.

3. The agricultural machine of claim 1, wherein the flattening component includes a scraper, a blade connector and a laser receiver; an upper side of the scraper is hinged with a lower end of the first electric actuator through the blade connector; a pedestal of the first electric actuator is hinged on the rack; one end of the flexible torsion bar is connected with the blade connector through a connecting sleeve; the other end of the flexible torsion bar is hinged on the rack through a connector; the laser receiver is mounted on the blade connector through a supporting rod.

\* \* \* \* \*